(12) United States Patent
Park et al.

(10) Patent No.: US 11,307,777 B2
(45) Date of Patent: Apr. 19, 2022

(54) MEMORY SYSTEM AND OPERATING METHOD THEREOF

(71) Applicant: SK hynix Inc., Gyeonggi-do (KR)

(72) Inventors: Sung Jin Park, Gyeonggi-do (KR); Jung Ae Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/162,634

(22) Filed: Jan. 29, 2021

(65) Prior Publication Data
US 2022/0083240 A1 Mar. 17, 2022

(30) Foreign Application Priority Data

Sep. 16, 2020 (KR) .................. 10-2020-0118940

(51) Int. Cl.
*G06F 3/06* (2006.01)
*H04L 9/08* (2006.01)
*H04L 9/32* (2006.01)

(52) U.S. Cl.
CPC .......... *G06F 3/0623* (2013.01); *G06F 3/0655* (2013.01); *G06F 3/0679* (2013.01); *H04L 9/088* (2013.01); *H04L 9/3236* (2013.01)

(58) Field of Classification Search
CPC .... G06F 3/0622; G06F 3/0623; G06F 3/0637; G06F 3/0655; G06F 3/0679; G06F 12/1408; G06F 12/1466; H04L 9/088; H04L 9/3236

USPC ................ 711/103, 152, 164; 713/184, 193; 726/30
See application file for complete search history.

(56) References Cited

U.S. PATENT DOCUMENTS

| | | | | |
|---|---|---|---|---|
| 2003/0204731 | A1* | 10/2003 | Pochuev ............ | H04N 1/32101 713/181 |
| 2018/0351749 | A1* | 12/2018 | Chen ........................ | H04L 9/14 |
| 2019/0052634 | A1* | 2/2019 | Bhatia ...................... | G06F 21/44 |
| 2019/0268318 | A1* | 8/2019 | Tsirkin .................. | H04L 63/126 |
| 2020/0313867 | A1* | 10/2020 | Yu ........................... | G06F 21/64 |

FOREIGN PATENT DOCUMENTS

| KR | 10-2014-0073397 | 6/2014 |
|---|---|---|
| KR | 10-2019-0063264 | 6/2019 |

\* cited by examiner

*Primary Examiner* — Gary J Portka
(74) *Attorney, Agent, or Firm* — IP & T Group LLP

(57) ABSTRACT

Embodiments of the disclosure relate to a memory system and an operating method thereof. The memory system may decrypt first firmware which is stored in the memory device and is encrypted using a symmetric-key encryption algorithm, with a first key stored in the memory device, may generate a second key based on second firmware, which is obtained by decrypting the first firmware, first data stored in a first area in the memory controller, and second data stored in a second area in the memory device, and may drive the second firmware when the first key and the second key are the same.

13 Claims, 14 Drawing Sheets

MEMORY SYSTEM AND OPERATING METHOD THEREOF

CROSS-REFERENCE TO RELATED APPLICATION

The present application claims priority under 35 U.S.C. § 119(a) to Korean Patent Application No. 10-2020-0118940, filed in the Korean Intellectual Property Office on Sep. 16, 2020, which is incorporated herein by reference in its entirety.

BACKGROUND

1. Technical Field

Various embodiments generally relate to a memory system and an operating method thereof.

2. Related Art

A memory system can include a storage device to store data. Such a memory system can operate on the basis of a request from a host, such as a computer, mobile device (e.g., smartphone or tablet PC), or any other similar electronic device. The examples of the memory system span from a traditional hard disk drive (HDD) to a semiconductor-based data storage device such as a solid state drive (SSD), a universal flash storage device (UFS), or an embedded MMC (eMMC) device.

The memory system may further include a memory controller for controlling the memory device, of which there may be more than one. The memory controller may receive a command from the host and execute the command or control read/write/erase operations on the memory device(s) in the memory system. The memory controller may also be used to run firmware for performing a logical operation for controlling such operations.

In order to prevent unauthorized exploitation of firmware, a memory system may store a key for encrypting and storing the firmware and decrypting the encrypted firmware. In this case, memory systems that use the same version of the firmware have the same key. Therefore, if the key is leaked or otherwise obtained without authorization from any of those memory systems, all memory systems using the same version of the firmware may also become vulnerable to security breach.

SUMMARY

Various embodiments are directed to a memory system and an operating method thereof supporting the use of a specific key in the process of encrypting and decrypting firmware in each of different memory systems.

Also, various embodiments are directed to a memory system and an operating method thereof capable of strengthening the security of firmware.

In one aspect, embodiments of the disclosure may provide a memory system including: a memory device; and a memory controller configured to communicate with the memory device, and control the memory device.

The memory controller may decrypt first firmware which is stored in the memory device and is encrypted using a symmetric-key encryption algorithm, with a first key stored in the memory device.

The memory controller may generate a second key based on second firmware, which is obtained by decrypting the first firmware, first data stored in a first area in the memory controller, and second data stored in a second area in the memory device.

The memory controller may drive the second firmware when the first key and the second key are the same.

Data stored in the first area and data stored in the second area may be unchangeable data.

The second key may be hash data which is generated by coding, according to a hash algorithm, data obtained by merging the second firmware, the first data and the second data.

In another aspect, embodiments of the disclosure may provide a method for operating a memory system including a memory device and a memory controller.

The method for operating a memory system may include decrypting first firmware which is stored in the memory device and is encrypted using a symmetric-key encryption algorithm, with a first key stored in the memory device.

The method for operating a memory system may include generating a second key based on second firmware, which is obtained by decrypting the first firmware, first data stored in a first area in the memory controller, and second data stored in a second area in the memory device.

The method for operating a memory system may include driving the second firmware when the first key and the second key are the same.

Data stored in the first area and data stored in the second area may be unchangeable data.

The second key may be hash data which is generated by coding, according to a hash algorithm, data obtained by merging the second firmware, the first data and the second data.

In another aspect, embodiments of the disclosure may provide a method of protecting original code.

The method of protecting original code may include generating a first key by coding a sequence of the original code and data according to a hash algorithm. The data may be specific to the system.

The method of protecting original code may include encrypting the original code using the first key according to a symmetric key algorithm to store the encrypted code in a system.

The method of protecting original code may include decrypting the stored code using the first key according to the symmetric key algorithm.

The method of protecting original code may include generating a second key by coding the sequence of the decrypted code and the data according to the hash algorithm.

The method of protecting original code may include comparing the first and second keys to determine whether the original code is protected.

According to embodiments of the disclosure, a specific key may be used in the process of encrypting and decrypting firmware in each memory system, and through this, the security of the firmware may be strengthened.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
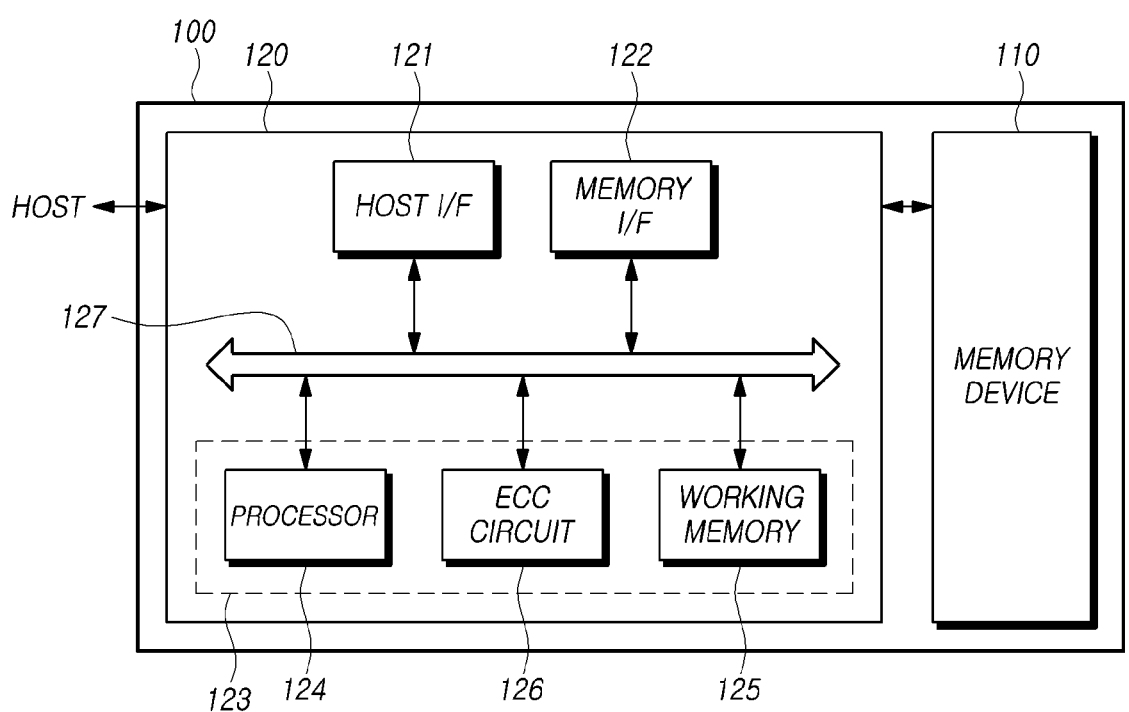
FIG. 1 is a diagram illustrating a schematic configuration of a memory system in accordance with an embodiment of the disclosure.

FIG. 1 is a diagram schematically illustrating a configuration of a memory system 100 in accordance with an embodiment of the disclosure.

In some implementations, the memory system 100 may include a memory device 110 configured to store data, and a memory controller 120 configured to control the memory device 110.

The memory device 110 may include multiple memory blocks each including memory cells for storing data. The memory device 110 may be configured to operate in response to control signals received from the memory controller 120. Operations of the memory device 110 may include, for example, a read operation, a program operation (also referred to as a "write operation"), and an erasure operation.

The memory cells in the memory device 110 are used to store data and may be arranged in a memory cell array. In some implementations in which the memory device 110 is a flash memory device, the memory cell array may be divided into memory blocks of memory cells and each block includes different pages of memory cells. In some implementations of NAND flash memory devices, a page of cells is the smallest memory unit that can be programmed (or written) and read, and the data stored in memory cells can be erased at the block level.

In some implementations, the memory device 110 may be implemented as any of various types, such as a double data rate synchronous dynamic random access memory (DDR SDRAM), a low power double data rate fourth generation (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (SU-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementations, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area in the memory device having a physical address corresponding to the received address from the controller.

In some implementations, the memory device 110 may perform, among others, a program operation, a read operation, and an erasure operation. During the program operation, the memory device 110 may write ("program") data to the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations to be performed on the memory device 110. The background operation may include an operation to optimize overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such a background operation of the memory device.

The memory controller 120 and the host may be separate devices. In some implementations, the memory controller 120 and the host may be integrated in a single device. In the following description, as an example, the memory controller 120 and the host are separate devices.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126.

The processor 124 may control overall operation of the memory controller 120. The processor 124 may perform a logical operation. The processor 124 may communicate with the host (HOST) through the host interface 121. The processor 124 may communicate with the memory device 110 through the memory interface 122.

The processor 124 may be used to run a flash translation layer (FTL) to effectively manage the memory operations on the memory system 100. For example, the processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host.

The processor 124 may execute firmware (FW) to control the operation of the memory controller 120. In other words, the processor 124 may control overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include a flash translation layer (FTL) configured to translate a logical addresses in the host requests to respective physical addresses of the memory device 110, a host interface layer (HIL) configured to interpret a command that the host issues to a data storage device such as the memory system 100 and to deliver the command to the FTL, and/or a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data to operate the memory controller 120. The working memory 125 may include, for example, a static RAM (SRAM), a dynamic RAM (DRAM), and/or a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the context of this patent document, a "sector" may refer to a data unit that is smaller than the smallest unit for a read operation (e.g., page) of a flash memory. Sectors constituting each piece of read data may be mapped based addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equal to the reference value, the error detection/correction circuit 126 may determine that the corresponding sector is correctable and the corresponding sector can be marked "pass."

The error detection/correction circuit 126 may perform error detection and correction operations successively on all read data. When a sector included in the read data is correctable, the error detection/correction circuit 126 may go on to the next sector to check as to whether an error correction operation is needed on the next sector. Upon completion of the error detection and correction operations on all the read data in this manner, the error detection/correction circuit 126 may identify which sector is deemed uncorrectable in the read data. The error detection/correction circuit 126 may provide information (e.g., address of uncorrectable sector) regarding the sectors deemed uncorrectable to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

The above-mentioned constituent elements 121, 122, 124, 125, and 126 of the memory controller 120 are illustrated in FIG. 1 by way of example. It is noted that one or more of the above-mentioned constituent elements of the memory controller 120 may be omitted, and/or two or more may be integrated into a single element. In addition, in some implementations, one or more other constituent elements may be added to the memory controller 120, in addition to those constituent elements shown.

Hereinafter, the memory device 110 is described in more detail with reference to FIG. 2.

Figure 2:
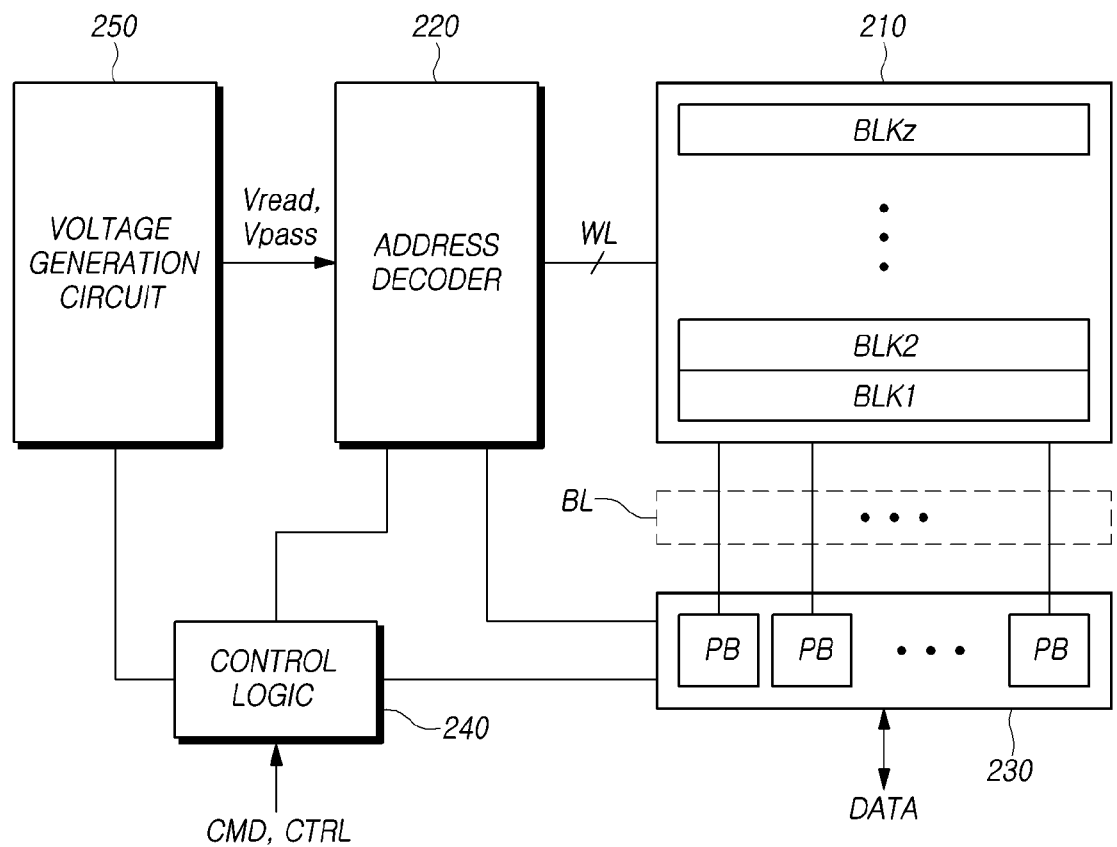
FIG. 2 is a block diagram schematically illustrating a memory device in accordance with an embodiment of the disclosure.

FIG. 2 is a block diagram schematically illustrating a memory device 110 in accordance with an embodiment of the disclosure.

In some implementations, the memory device 110 may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be arranged in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure and, in some implementations, may be arranged in a three-dimensional structure.

Each of the multiple memory cells in the memory cell array 210 may store at least one bit of data. For example, each of the multiple memory cells in the memory cell array 210 may be a single-level cell (SLC) configured to store one bit of data, a multi-level cell (MLC) configured to store two bits of data, a triple-level cell (TLC) configured to store three bits of data, or a quad-level cell (QLC) configured to store four bits of data. As another example, the memory cell array 210 may include multiple memory cells that are configured to store at least five bits of data per memory cell.

Referring to FIG. 2, the address decoder 220, the read/write circuit 230, the control logic 240, and the voltage generation circuit 250 may collectively operate as a peripheral circuit configured to drive the memory cell array 210.

The address decoder 220 may be connected to the memory cell array 210 through the multiple word lines WL.

The address decoder 220 may be configured to operate in response to commands and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may apply the read voltage Vread to a selected word line WL inside a selected memory block, when applying the read voltage during a read operation, and may apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation on a page by page basis. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that can hold data for data processing and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change in the amount of current that flows based on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control overall operation of the memory device 110 in response to the control signal CTRL. The control logic 240 may output a control signal for adjusting the voltage level at sensing nodes of multiple page buffers PB.

The control logic 240 may control the read/write circuit 230 to perform a read operation on the memory cells in the memory cell array 210. The voltage generation circuit 250 may generate a read voltage Vread and a pass voltage Vpass, which are used during the read operation, in response to a voltage generation circuit control signal provided by the control logic 240.

A memory block BLK included in the memory device 110 may consist of multiple pages PG, each of which includes a plurality of memory cells. In some implementations, the plurality of memory cells can be arranged in multiple strings. The multiple pages PG can be mapped to multiple word lines WL, and the multiple strings STR can be mapped to multiple bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect when viewed from above, thereby defining a memory array including multiple memory cells MC. Each memory cell MC may have a transistor TR arranged therein.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed on a page by page basis, and an erasure operation may be performed on a memory block by memory block basis.

Figure 3:
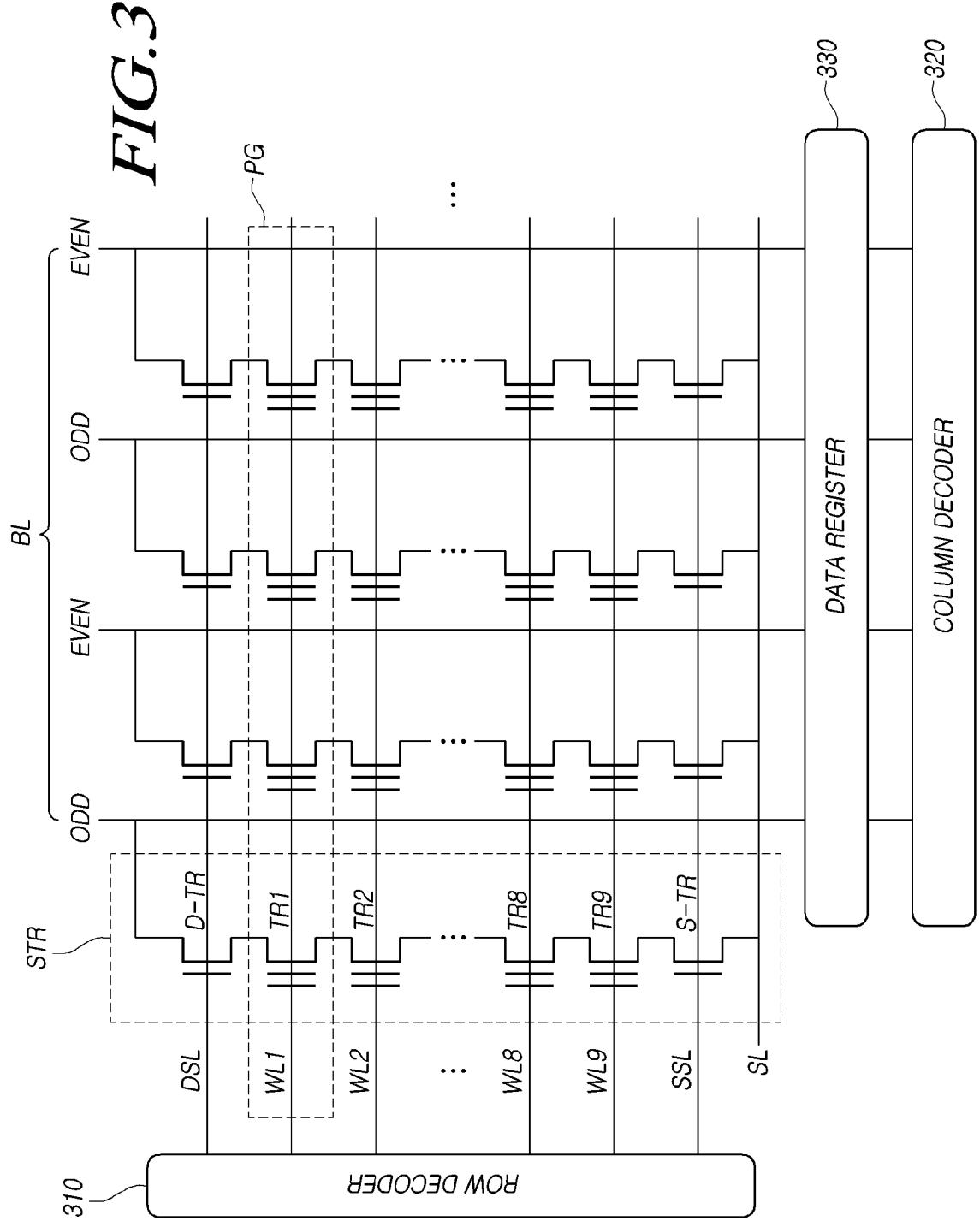
FIG. 3 is a diagram illustrating a structure of word lines and bit lines of a memory device in accordance with an embodiment of the disclosure.

FIG. 3 is a diagram illustrating a structure of word lines WL and bit lines BL of a memory device 110 in accordance with an embodiment of the disclosure.

Referring to FIG. 3, the memory device 110 has a core area in which memory cells MC are concentrated, and an auxiliary area which corresponds to the remaining area other than the core area. The auxiliary area includes circuitry for supporting the operations of the memory cell array 210.

The core area may include pages PG and strings STR. In some implementations, multiple word lines WL1-WL9 and multiple bit lines BL are arranged to intersect when viewed from above.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in connection with conducting a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of odd-numbered bit line BL and even-numbered bit line B are coupled in common to a column decoder 320.

The address may be used to access one or more memory cells MC in the core area. The address can be provided through the input/output end to the row decoder 310 and the column decoder 320 to select a corresponding target memory cell. In the context of this patent document, the word "target memory cell" is used to indicate one of the memory cells MC targeted to be accessed from the memory controller or the user, and in some implementations the memory cells MC may be located at intersections between the word lines WL1-WL9 connected to the row decoder 310 and the bit lines BL connected to the column decoder 320.

Pages PG in a first direction (for example, X-axis direction) are connected to a commonly used line referred to as a word line WL, and strings STR in a second direction (for example, Y-axis direction) are connected to a common line referred to as a bit line BL. The voltage applied to a memory cell MC among memory cells MC connected in series may slightly differ from the voltage applied to another memory cell MC further down line due to the voltage drop across the preceding memory cell(s) MC.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading overall performance of the memory device 110.

Referring to the example illustrated in FIG. 3, in one string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch that connects the corresponding string STR to the data register 330. The second selection transistor S-TR is used as a switch that connects the corresponding string STR to the source line SL. That is, the first selection transistor D-TR and the second selection transistor S-TR can be used to enable or disable the corresponding string STR.

During a program operation, the memory system 100 fills the target memory cell MC of the bit line BL which is to be programmed with electrons. Accordingly, the memory system 100 applies a turn-on voltage Vcc to the gate electrode of the first selection transistor D-TR, thereby turning on the first selection transistor D-TR, and applies a turn-off voltage (for example, 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding string STR and drain to the source line SL, which corresponds to the ground voltage, such that the voltage level of the bit line BL can be measured. However, during a read operation, there may be a time difference in the on/off timing between the first selection transistor D-TR and the second selection transistor S-TR.

The memory system 100 may apply a voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gate FG of the selected memory cell.

Figure 4:
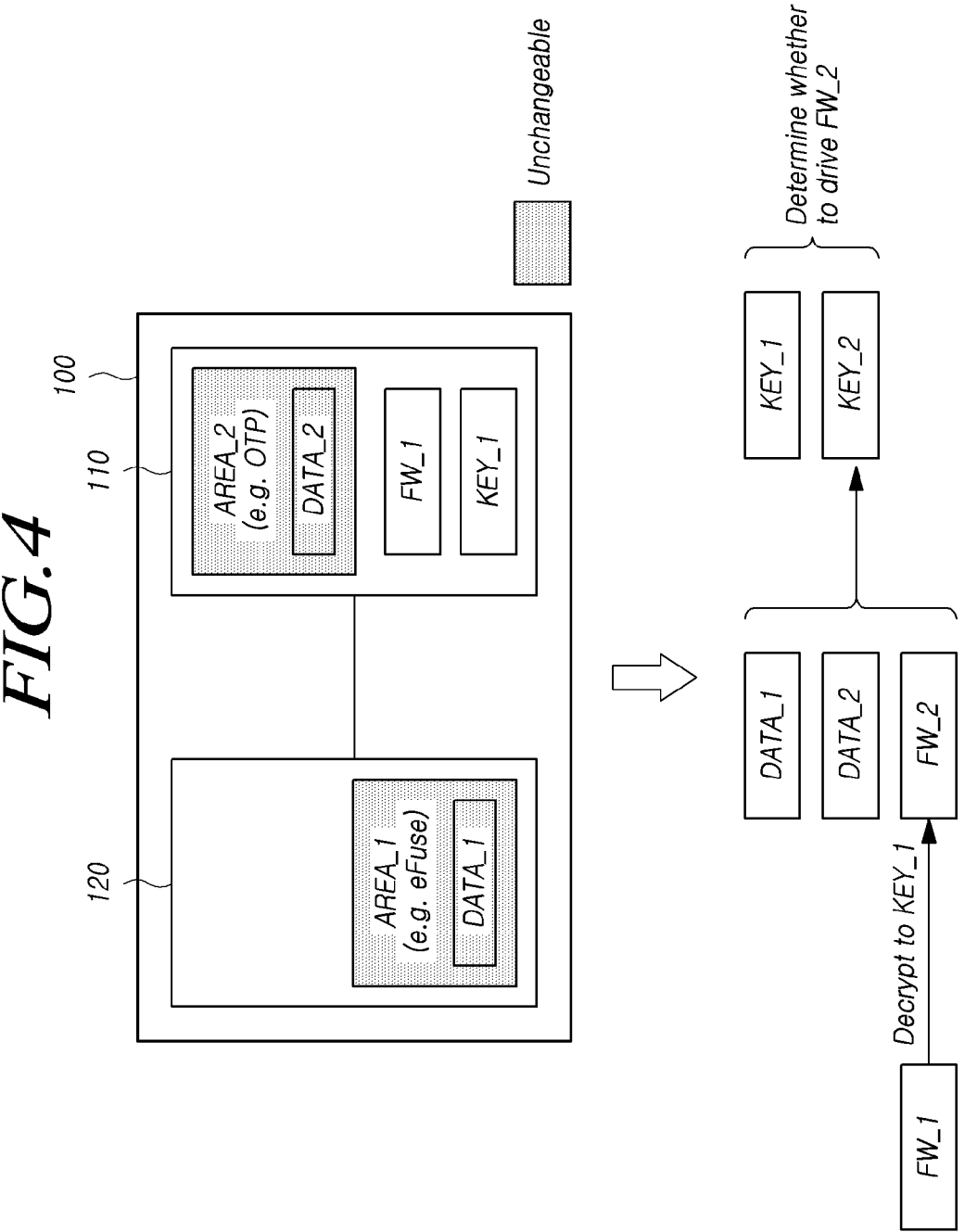
FIG. 4 is a diagram schematically illustrating a structure and operation of the memory system in accordance with an embodiment of the disclosure.

FIG. 4 is a diagram schematically illustrating a structure and operation of the memory system 100 in accordance with an embodiment of the disclosure.

Referring to FIG. 4, the memory controller 120 of the memory system 100 may include a first area AREA_1. First data DATA_1 may be stored in the first area AREA_1. The first data DATA_1 may include information specific to the memory controller 120. The information unique to the memory controller 120 means that the information is specific for the memory controller 120 and no other memory controller has the specific information.

Data stored in the first area AREA_1 is unchangeable. That is to say, once data is stored in the first area AREA_1, the memory controller 120 may read that data, but cannot change it. Since the first data DATA_1 is stored in the first area AREA_1, DATA_1 is unchangeable.

The first area AREA_1 may be set as follows. For example, the memory controller 120 may set a specific area of the working memory 125 as the first area AREA_1. For another example, the memory controller 120 may set, as the first area AREA_1, a memory area located in a separate hardware circuit. The separate hardware circuit may be an eFuse circuit.

The memory device 110 of the memory system 100 may store first firmware FW_1. Upon release, the first firmware FW_1 may be stored in the memory device 110 during a process of manufacturing the memory system 100 or a process of performing field firmware update (FFU).

In FIG. 4, the first firmware FW_1 may be stored in the memory device 110 (e.g., a memory block in the memory device 110) and encrypted using a symmetric-key encryption algorithm. The symmetric-key encryption algorithm is an algorithm that uses the same key in an encryption process and a decryption process. For example, the symmetric-key algorithm may be an Advanced Encryption Standard (AES) algorithm or a Data Encryption Standard (DES) algorithm.

The memory device 110 may store a first key KEY_1. The first key KEY_1 is used to decrypt the first firmware FW_1. Since the first firmware FW_1 is encrypted using the symmetric-key encryption algorithm, the first key KEY_1 is also used to encrypt the first firmware FW_1.

The memory device 110 may include a second area AREA_2. Second data DATA_2 may be stored in the second area AREA_2. The second data DATA_2 may include information specific to the memory device 110.

Like the data stored in the first area AREA_1, data stored in the second area AREA_2 is also unchangeable. That is to say, once data is stored in the second area AREA_2, the memory device 110 may read that data, but cannot change it. Since the second data DATA_2 is stored in the second area AREA_2, DATA_2 is unchangeable.

The second area AREA_2 may be set as follows. For example, a specific memory block among memory blocks in the memory device 110 may be set as the second area AREA_2. For another example, the memory device 110 may set a memory area located in a separate hardware circuit (e.g., a one-time programmable (OTP) memory), as the second area AREA_2.

In order to drive firmware, the memory controller 120 may first generate second firmware FW_2 by decrypting the first firmware FW_1 with the first key KEY_1. Then, the memory controller 120 may generate a second key KEY_2 based on the second firmware FW_2, the first data DATA_1 and the second data DATA_2. Finally, the memory controller 120 may determine whether to drive the second firmware FW_2, by comparing the generated second key KEY_2 and the first key KEY_1.

Figure 5:
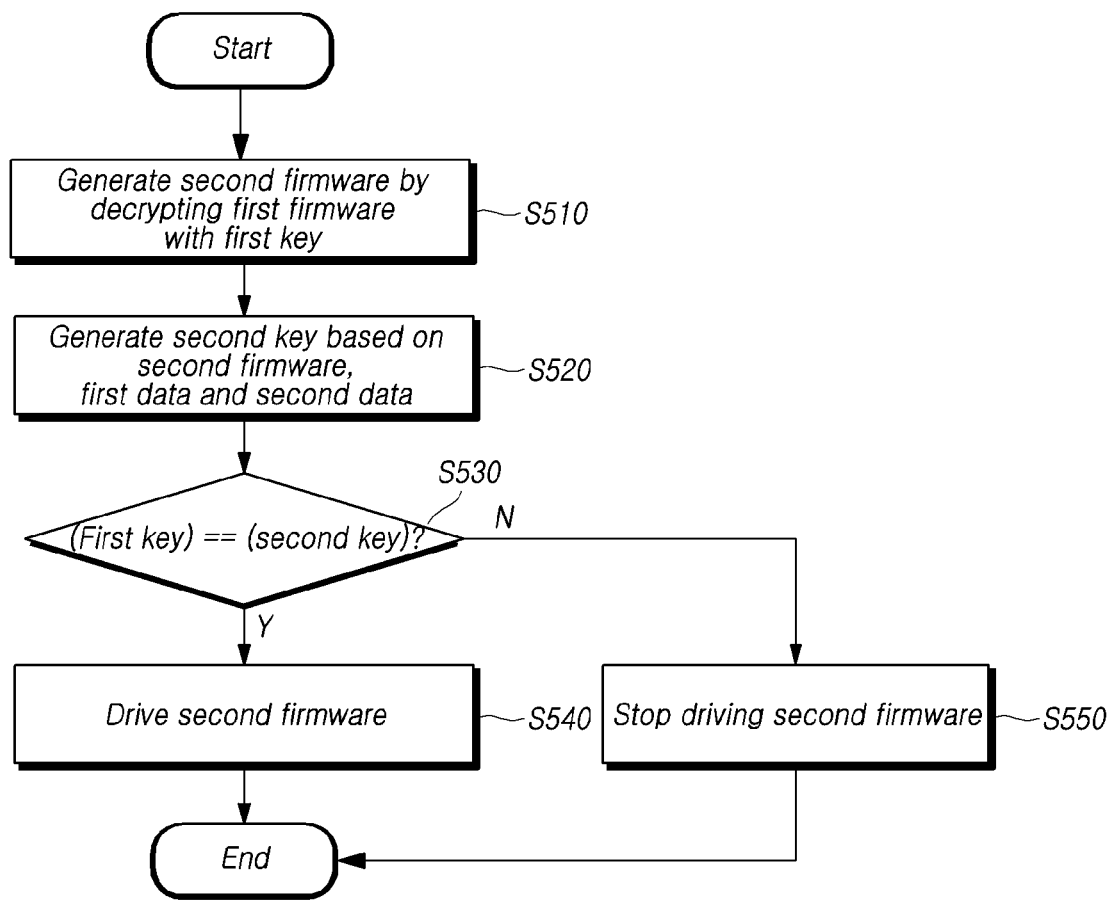
FIG. 5 is a flow chart illustrating an operation of the memory system in accordance with an embodiment of the disclosure.

This aspect is described in more detail through the flow chart of FIG. 5.

FIG. 5 is a flow chart illustrating an operation of the memory system 100 in accordance with an embodiment of the disclosure.

Referring to FIG. 5, the memory controller 120 of the memory system 100 may generate the second firmware FW_2 by decrypting the first firmware FW_1 with the first key KEY_1 (S510).

The memory controller 120 may generate the second key KEY_2 based on the second firmware FW_2, the first data DATA_1 and the second data DATA_2 (S520). An example in which the memory controller 120 generates the second key KEY_2 is described below in detail with reference to FIG. 6.

The memory controller 120 determines whether the first key KEY_1 and the second key KEY_2 are the same (S530).

If the first key KEY_1 and the second key KEY_2 are the same (S530—Y), the memory controller 120 may drive the second firmware FW_2, as a result of determining that the second firmware FW_2 has been generated by normally decrypting the first firmware FW_1 (S540). On the other hand, if the first key KEY_1 and the second key KEY_2 are different (S530—N), the memory controller 120 may stop the operation of driving the second firmware FW_2, as a result of determining that an error has occurred in the process of decrypting the first firmware FW_1 (S550). In this case, the memory controller 120 may drive default firmware, enter an operation stop state, or be reset.

Figure 6:
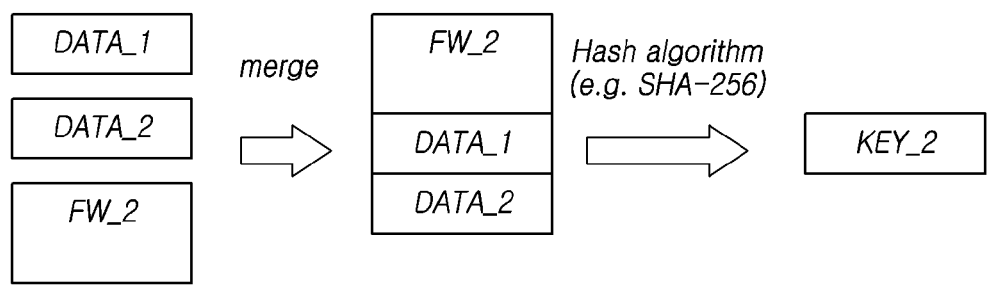
FIG. 6 is a flow chart illustrating operation of a memory system to generate a second key in accordance with an embodiment of the disclosure.

FIG. 6 is a flow chart illustrating an example in which the memory system 100 generates the second key KEY_2 in accordance with an embodiment of the disclosure.

Referring to FIG. 6, in order to generate the second key KEY_2, the memory controller 120 of the memory system 100 may first merge the second firmware FW_2, the first data DATA_1 and the second data DATA_2.

A sequence in which the second firmware FW_2, the first data DATA_1 and the second data DATA_2 are merged may be set in advance. For example, the memory controller 120 may merge these three items such that the resulting sequence is the second firmware FW_2, the first data DATA_1, and the second data DATA_2.

Then, the memory controller 120 may generate the second key KEY_2 by coding(transforming), according to a hash algorithm, data obtained by merging the second firmware FW_2, the first data DATA_1 and the second data DATA_2.

The hash algorithm may be any algorithm which generates a hash value of a fixed magnitude from the data on which the algorithm operates. The hash value may be specific to the data. For example, the hash algorithm may be the Message-Digest algorithms 5 (MD5) or the Secure Hash Algorithm known as SHA-256.

Hereinbelow, by comparing cases where the first key KEY_1 and the second key KEY_2 are the same and where the first key KEY_1 and the second key KEY_2 are different, how the memory system 100 can strengthen the security of firmware in accordance with an embodiment of the disclosure is described.

Figure 7:
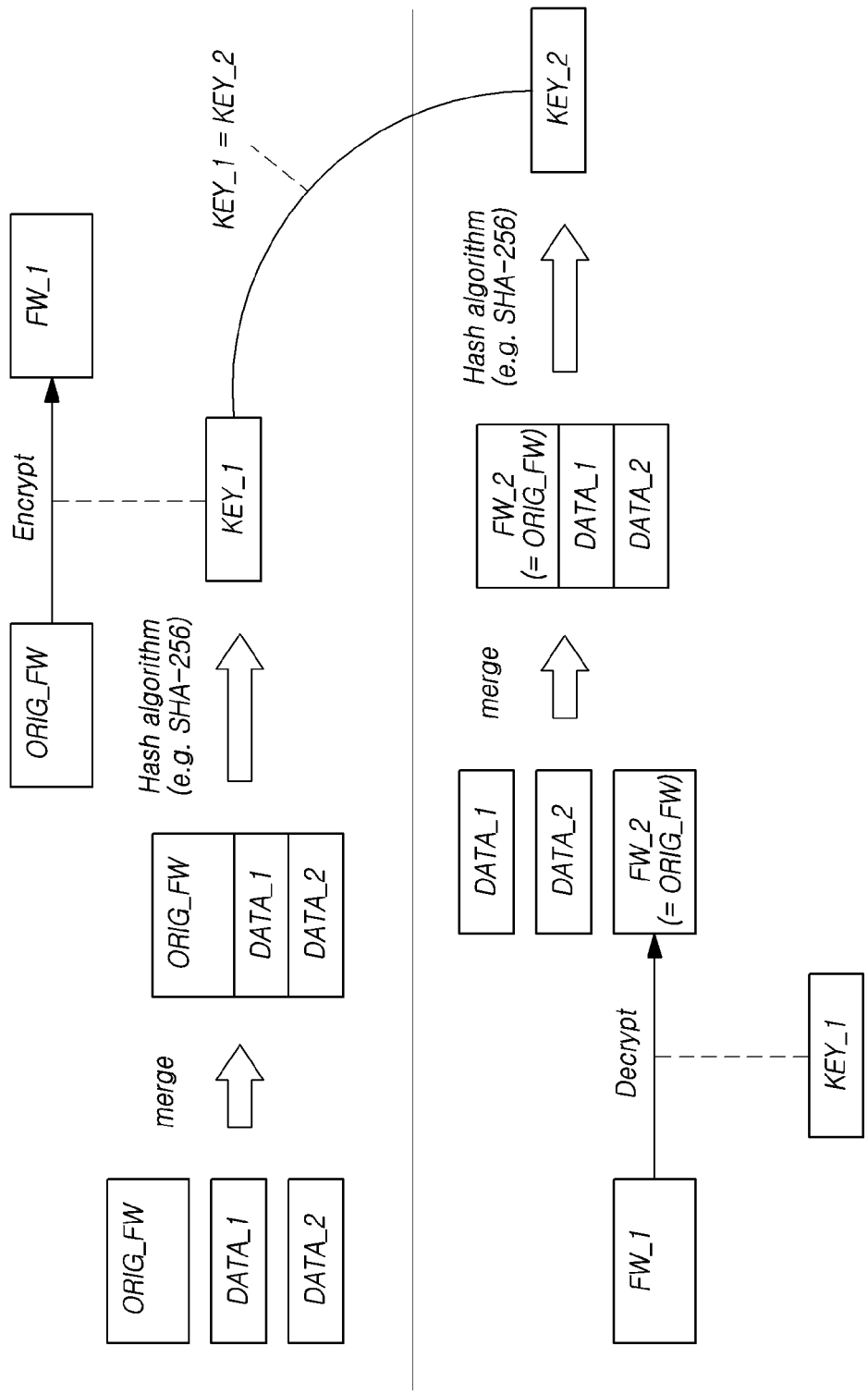
FIG. 7 is a diagram illustrating an example in which a first key and a second key are the same in accordance with an embodiment of the disclosure.

FIG. 7 is a diagram illustrating an example in which the first key KEY_1 and the second key KEY_2 are the same in accordance with an embodiment of the disclosure.

First, a process in which the memory system 100 generates the first firmware FW_1 to be stored in the memory device 110 is described.

Referring to FIG. 7, the memory controller 120 of the memory system 100 may generate the first key KEY_1 by merging original firmware ORIG_FW and the first data DATA_1 and second data DATA_2 and coding the merged data according to a set hash algorithm (e.g., SHA-256 algorithm). As described above, since DATA_1 and DATA_2 are each specific to the memory device 110, the generated first key KEY_1 is also specific to the memory system 100.

The first firmware FW_1 is generated by encrypting the original firmware ORIG_FW with the first key KEY_1 using the symmetric-key encryption algorithm. In other words, the first firmware FW_1 is the result of the original firmware ORIG_FW being encrypted using the symmetric-key encryption algorithm (e.g., AES-256 algorithm).

A case in which the first firmware FW_1 is not changed because there is no attack is described.

In this case, the second firmware FW_2 which is generated by decrypting the first firmware FW_1 with the first key KEY_1 is the same as the original firmware ORIG_FW. This is because the first firmware FW_1 is encrypted using the symmetric-key encryption algorithm and is decrypted with the first key KEY_1 which is the same key as that used to encrypt the original firmware ORIG_FW.

Accordingly, the second key KEY_2, which is generated by merging the second firmware FW_2, the first data DATA_1 and the second data DATA_2 and coding the merged data according to the set hash algorithm, is the same as the first key KEY_1. This is because the second key KEY_2 is hash data which is generated by coding the same data according to the same hash algorithm.

Figure 8:
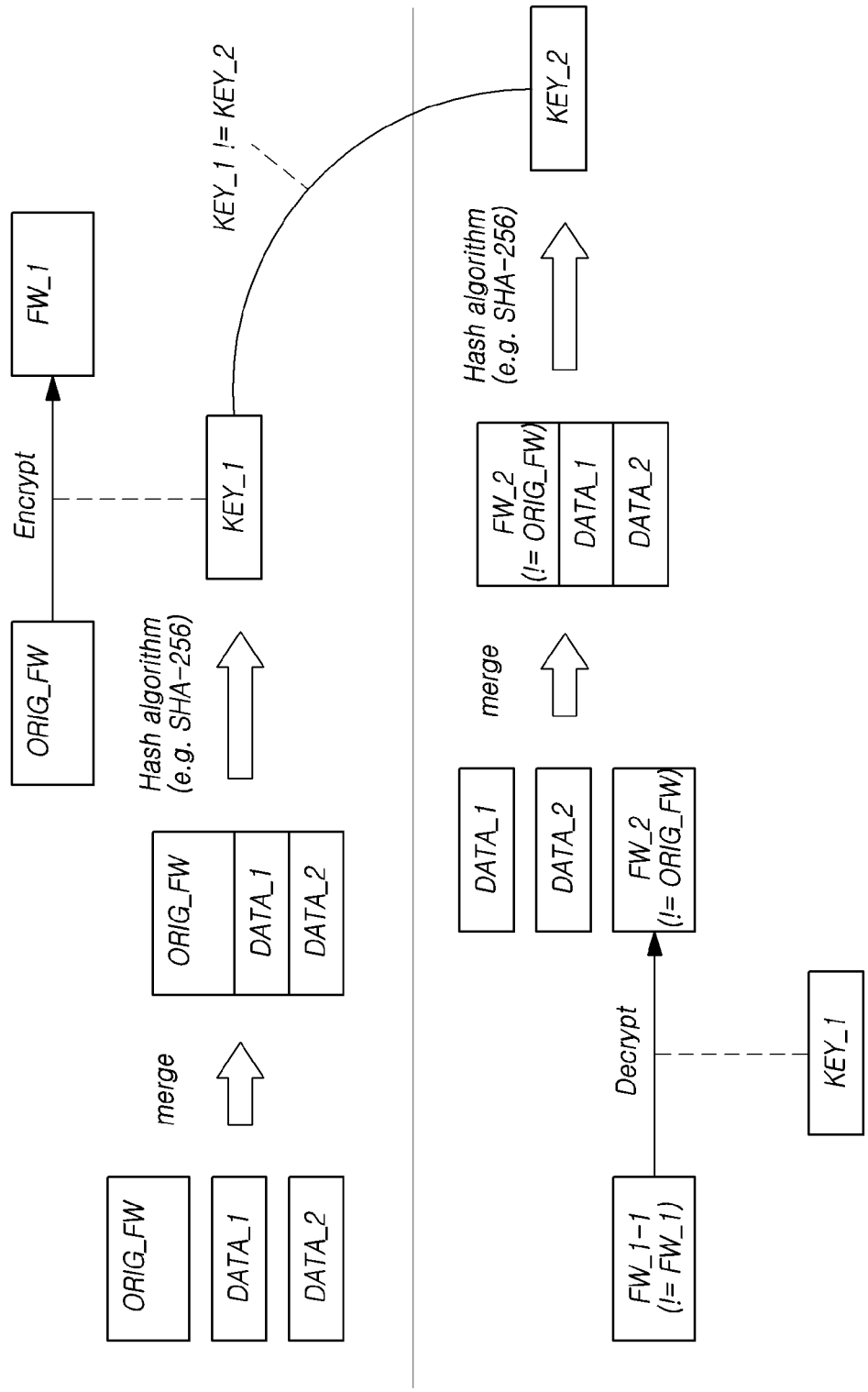
FIG. 8 is a diagram illustrating an example in which a first key and a second key are different in accordance with an embodiment of the disclosure.

FIG. 8 is a diagram illustrating an example in which the first key KEY_1 and the second key KEY_2 are different in accordance with an embodiment of the disclosure.

Referring to FIG. 8, a process in which the memory controller 120 of the memory system 100 generates the first firmware FW_1 is the same as that of FIG. 7.

A case in which the first firmware FW_1 is compromised (referred to as firmware FW_1-1) due to an attack from an external attacker is described.

The firmware FW_1-1 is different from the first firmware FW_1. Therefore, the second firmware FW_2 which is generated by decrypting the firmware FW_1-1 with the first key KEY_1 is also different from the original firmware ORIG_FW. In this case, FW_2 is likely corrupted.

Accordingly, the second key KEY_2, which is generated by merging the corrupted second firmware FW_2, the first data DATA_1 and the second data DATA_2 and coding the merged data according to the set hash algorithm, is different from the first key KEY_1. This is because the second key KEY_2 is hash data which is generated by coding different data (i.e., the corrupted second firmware FW_2) according to the same hash algorithm.

Figure 9:
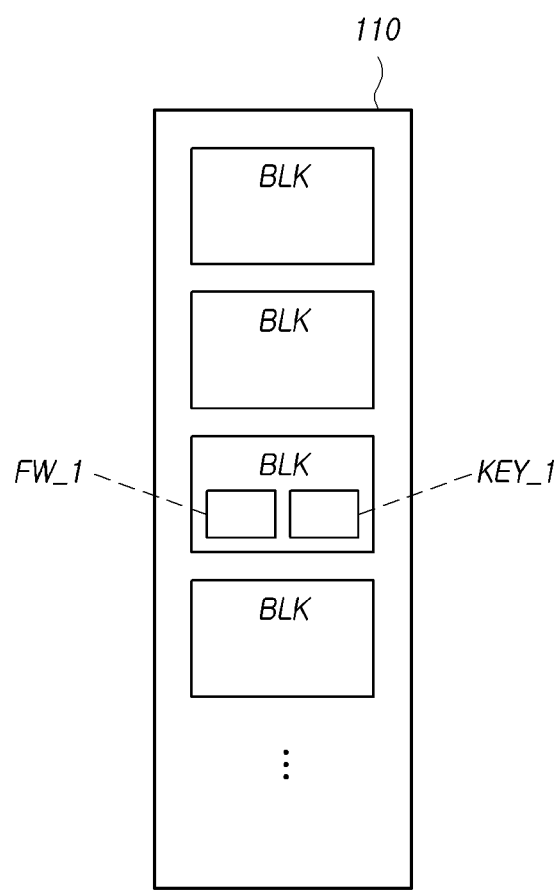
FIG. 9 is a diagram illustrating an example in which first firmware and a first key are stored in the memory device in accordance with an embodiment of the disclosure.

FIG. 9 is a diagram illustrating an example in which the first firmware FW_1 and the first key KEY_1 are stored in the memory device 110 in accordance with an embodiment of the disclosure.

Referring to FIG. 9, the first firmware FW_1 and the first key KEY_1 may be stored in the same memory block. Namely, the first firmware FW_1 and the first key KEY_1 may be stored in the same memory block among the plurality of memory blocks BLK in the memory device 110. By storing the first firmware FW_1 and the first key KEY_1 in the same memory block, the memory system 100 may efficiently cope with an error that may occur in the first firmware FW_1 and the first key KEY_1.

Hereinafter, specific examples of the first data DATA_1 stored in the first area AREA_1 and the second data DATA_2 stored in the second area AREA_2 are described.

As described above, the first data DATA_1 includes information specific to the memory controller 120, and the second data DATA_2 includes information specific to the memory device 110.

Therefore, among memory systems using the same original firmware ORIG_FW, the first keys KEY_1 generated based on the first data DATA_1 and the second data DATA_2 may be different from one another. The first data DATA_1 may be determined according to specific characteristics of the memory controller 120, and the second data DATA_2 may be determined according to specific characteristics of the memory device 110. Accordingly, the first keys KEY_1 generated based on the first data DATA_1 and the second data DATA_2 may be different from one another among the memory systems using the same original firmware ORIG_FW. The example of specific characteristics of the memory controller 120 and the memory device 110 is described in FIG. 10 and FIG. 11.

Which part of data stored in the first area AREA_1 is selected as the first data DATA_1 and which part of data stored in the second area AREA_2 is selected as the second data DATA_2 may be determined according to how the security level of the first key KEY_1 is to be set.

For example, if all data stored in the first area AREA_1 is considered the first data DATA_1 and all data stored in the second area AREA_2 is considered the second data DATA_2, a lot of information specific to the memory system 100 is used. Therefore, the random characteristic of the first key KEY_1 is enhanced and thus security level is raised, but resources used to generate the first key KEY_1 increase. On the other hand, if only some data stored in the first area AREA_1 is considered the first data DATA_1 and only some data stored in the second area AREA_2 is considered the second data DATA_2, the random characteristic of the first key KEY_1 is degraded and thus security level is lowered, but resources used to generate the first key KEY_1 decrease.

Figure 10:
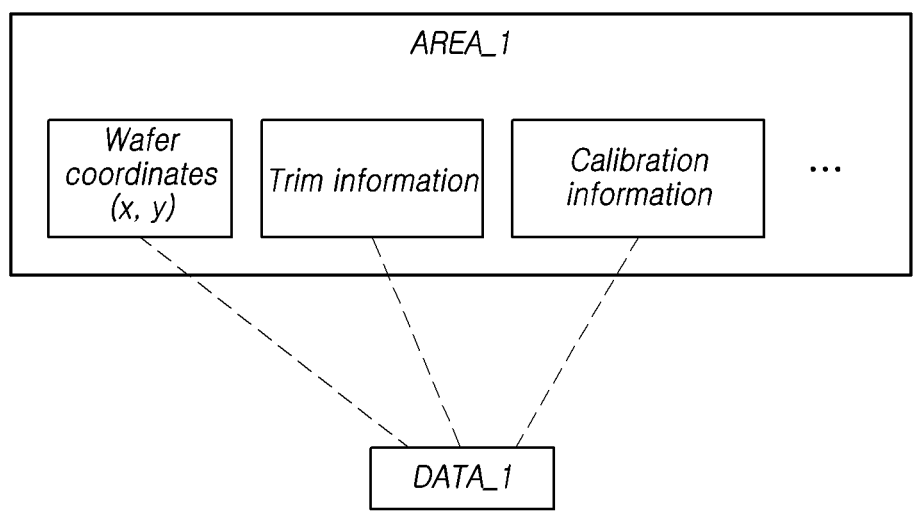
FIG. 10 is a diagram illustrating data stored in a first area in accordance with an embodiment of the disclosure.

FIG. 10 is a diagram illustrating an example of data stored in the first area AREA_1 in accordance with an embodiment of the disclosure.

Referring to FIG. 10, (x, y) representing coordinate information of a wafer for the memory controller 120, trim information on a supply voltage supplied to the memory system 100 (used to regulate the operation of an LDO regulator), calibration information on the supply voltage, may be stored in the first area AREA_1. The wafer coordinate information, supply voltage trim information and supply voltage calibration information are specific to the memory controller 120.

The first data DATA_1 may include at least one of the wafer coordinate information, the supply voltage trim information and the supply voltage calibration information.

Figure 11:
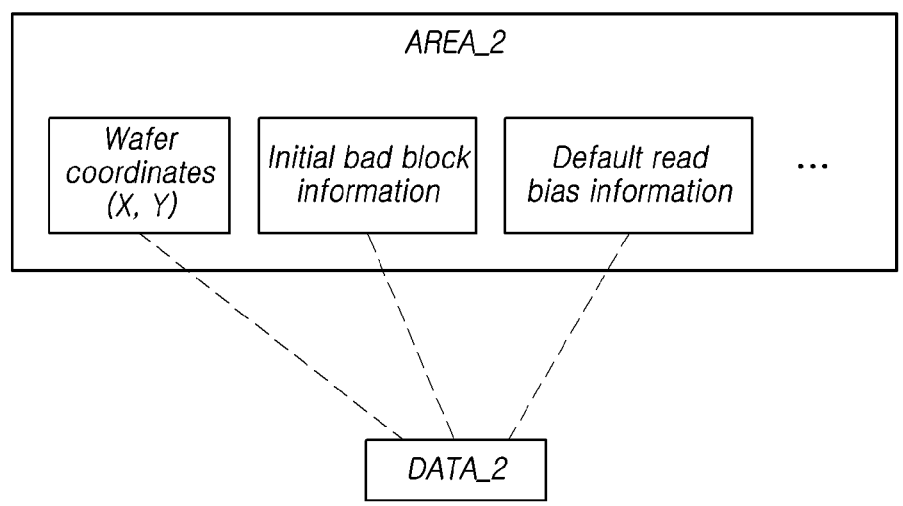
FIG. 11 is a diagram illustrating data stored in a second area in accordance with an embodiment of the disclosure.

FIG. 11 is a diagram illustrating an example of data stored in the second area AREA_2 in accordance with an embodiment of the disclosure.

Referring to FIG. 11, (x, y) representing coordinate information of a wafer for the memory device 110, information on an initial bad block in the memory device 110, information on a default read bias used when data stored in the memory device 110 is read may be stored in the second area AREA_2. The wafer coordinate information, initial bad block information and default read bias information are specific to the memory device 110.

The second data DATA_2 may include at least one of the wafer coordinate information, the initial bad block information and the default read bias information.

The above description is directed to a case in which a key for encrypting/decrypting firmware is generated using the first data DATA_1 as information specific to the memory controller 120 and the second data DATA_2 as information specific to the memory device 110.

Hereinafter, an example of using the first data DATA_1 and second data DATA_2 in signing for verifying the integrity of firmware is described.

In order to verify the integrity of firmware, the memory system 100 may extract a key through a hash-based message authentication code (HMAC)-related operation for firmware (original firmware or encrypted firmware), and may verify the extracted key and signing data stored in the memory system 100, by using a symmetric-key algorithm or an asymmetric-key algorithm (e.g., Rivest-Shamir-Adleman (RSA) algorithm).

Figure 12:
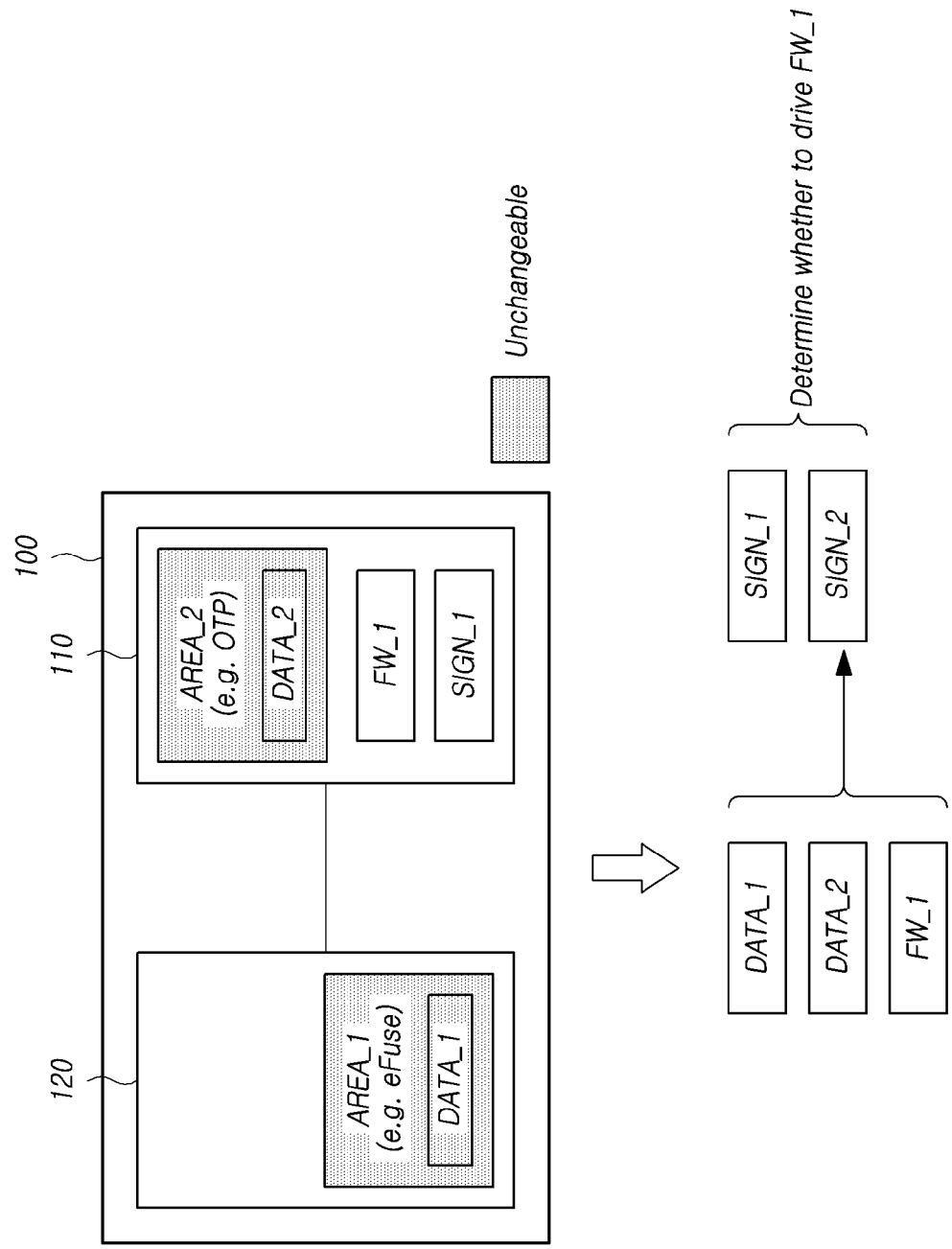
FIG. 12 is a diagram schematically illustrating another example of structure and operation of the memory system in accordance with an embodiment of the disclosure.

FIG. 12 is a diagram illustrating another example of a schematic structure and operation of the memory system 100 in accordance with an embodiment of the disclosure.

Referring to FIG. 12, in the same manner as in FIG. 4, the memory controller 120 may include a first area AREA_1, in which first data DATA_1 is stored.

Also, in the same manner as in FIG. 4, the memory device 110 may include a second area AREA_2, in which second data DATA_2 is stored.

The memory device 110 may store first firmware FW_1. However, unlike FIG. 4, the first firmware FW_1 stored in the memory device 110 in FIG. 12 is not encrypted firmware. The memory device 110 may store a first sign SIGN_1 which is generated based on the first firmware FW_1, the first data DATA_1 and the second data DATA_2.

In FIG. 12, the memory controller 120 of the memory system 100 may generate a second sign SIGN_2 based on the first firmware FW_1 stored in the memory device 110, the first data DATA_1 and the second data DATA_2, and may compare the generated second sign SIGN_2 with the first sign SIGN_1.

If the first sign SIGN_1 and the second sign SIGN_2 are the same, it means that the integrity of the first firmware FW_1 has been verified. Therefore, the memory controller 120 may drive the first firmware FW_1. On the other hand, if the first sign SIGN_1 and the second sign SIGN_2 are different, it means that the integrity of the first firmware FW_1 is destroyed. Therefore, the memory controller 120 may stop the operation of driving the first firmware FW_1.

Figure 13:
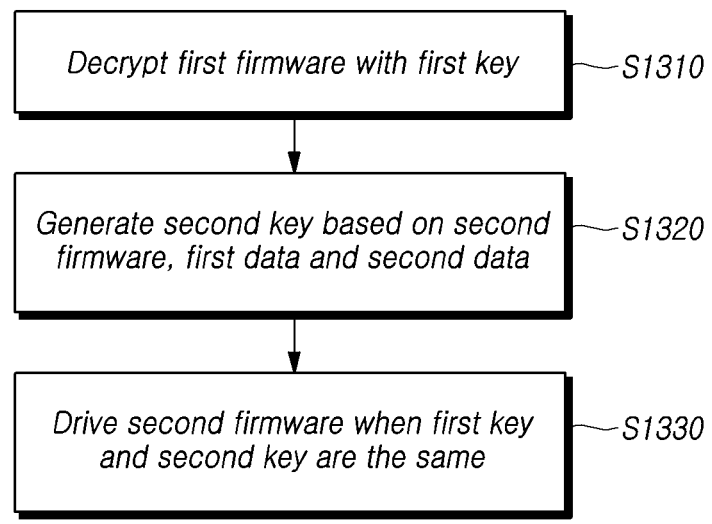
FIG. 13 is a diagram illustrating a method for operating the memory system in accordance with an embodiment of the disclosure.

FIG. 13 is a diagram illustrating a method for operating the memory system 100 in accordance with the embodiments of the disclosure.

Referring to FIG. 13, the method for operating the memory system 100 may include operation S1310 of decrypting the first firmware FW_1, stored in the memory device 110 and encrypted using the symmetric-key encryption algorithm, with the first key KEY_1 stored in the memory device 110.

Further, the method for operating the memory system 100 may include operation S1320 of generating the second key KEY_2 based on the second firmware FW_2, which is firmware obtained by decrypting the first firmware FW_1, the first data DATA_1, which is stored in the first area AREA_1 in the memory controller 120, and the second data DATA_2, which is stored in the second area AREA_2 in the memory device 110. Data stored in the first area AREA_1 and data stored in the second area AREA_2 are unchangeable data.

Further, the method for operating the memory system 100 may include operation S1330 of driving the second firmware FW_2 when the first key KEY_1 and the second key KEY_2 are the same.

The second key KEY_2 may be hash data which is generated by coding, according to a hash algorithm, data obtained by merging the second firmware FW_2, the first data DATA_1 and the second data DATA_2. For example, the hash algorithm may be SHA-256.

The first key KEY_1 may be stored in the same memory block as a memory block in which the first firmware FW_1 is stored.

The first data DATA_1 may include at least one among wafer coordinate information of the memory controller 120, trim information on a supply voltage and calibration information on the supply voltage.

The second data DATA_2 may include at least one among information on an initial bad block included in the memory device 110, default read bias information and wafer coordinate information of the memory device 110.

In some implementations, the operation of the memory controller 120 described above may be controlled by the control circuit 123, and may be performed in such a manner that the processor 124 executes (drives) firmware in connection with overall operation of the memory controller 120.

Figure 14:
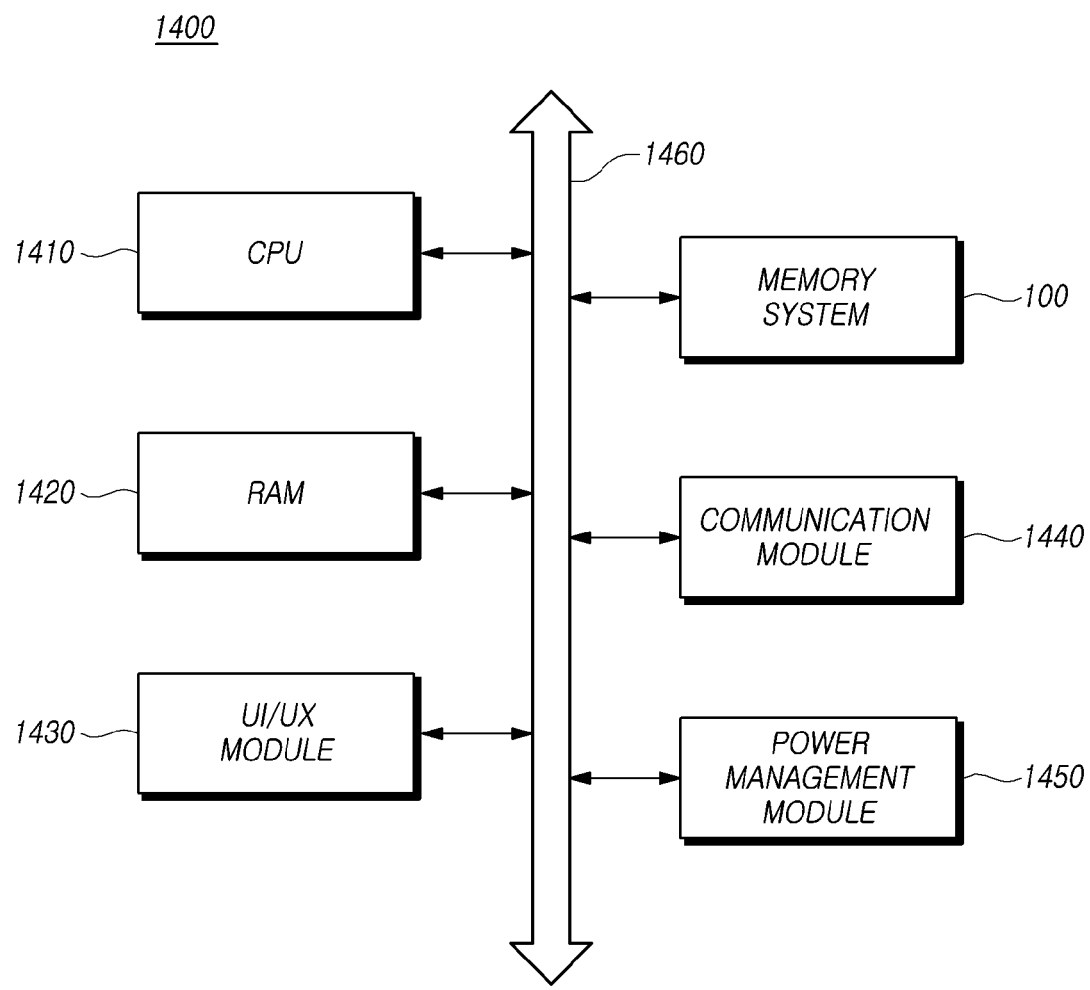
FIG. 14 is a diagram illustrating a configuration of a computing system in accordance with embodiments of the disclosure.

FIG. 14 is a diagram illustrating the configuration of a computing system 1400 in accordance with an embodiment of the disclosure.

Referring to FIG. 14, the computing system 1400 may include: a memory system 100 electrically connected to a system bus 1460; a CPU 1410 configured to control overall operation of the computing system 1400; a RAM 1420 configured to store data and information related to operations of the computing system 1400; a user interface/user experience (UI/UX) module 1430 configured to provide the user with a user environment; a communication module 1440 configured to communicate with an external device as a wired and/or wireless type; and a power management module 1450 configured to manage power used by the computing system 1400.

The computing system 1400 may be a personal computer (PC) or may include a mobile terminal such as a smartphone, a tablet or various electronic devices.

The computing system 1400 may further include a battery for supplying an operating voltage, and may further include an application chipset, a graphic-related module, a camera image processor, and a DRAM. Other elements known to those skilled in the art may be included as well.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be reduced or minimized. In addition, the disclosed technology can be implemented in a way that reduces or minimizes an overhead occurring in the process of calling a specific function.

Although various embodiments of the invention have been illustrated and described, those skilled in the art will appreciate that various modifications, additions and substitutions are possible based on what is described and illustrated herein. The invention encompasses all such variations that fall within the scope of the claims.

What is claimed is:

1. A memory system comprising:
    a memory device; and
    a memory controller configured to communicate with the memory device, and control the memory device,
    wherein the memory controller:
    decrypts first firmware, which is stored in the memory device and is encrypted using a symmetric-key encryption algorithm, with a first key stored in the memory device,
    generates a second key based on second firmware, which is obtained by decrypting the first firmware, first data stored in a first area in the memory controller, and second data stored in a second area in the memory device, and
    drives the second firmware when the first key and the second key are the same, and
    wherein data stored in the first area and data stored in the second area are unchangeable data.

2. The memory system according to claim 1, wherein the second key is hash data which is generated by coding, according to a hash algorithm, data obtained by merging the second firmware, the first data and the second data.

3. The memory system according to claim 2, wherein the hash algorithm is SHA-256.

4. The memory system according to claim 1, wherein the first key is stored in the same memory block in which the first firmware is stored.

5. The memory system according to claim 1, wherein the first data includes at least one among wafer coordinate information of the memory controller, trim information on a supply voltage and calibration information on the supply voltage.

6. The memory system according to claim 1, wherein the second data includes at least one among information on an initial bad block in the memory device, default read bias information and wafer coordinate information of the memory device.

7. A method for operating a memory system including a memory device and a memory controller, comprising:
    decrypting first firmware, which is stored in the memory device and is encrypted using a symmetric-key encryption algorithm, with a first key stored in the memory device;
    generating a second key based on second firmware, which is obtained by decrypting the first firmware, first data stored in a first area in the memory controller, and second data stored in a second area in the memory device; and
    driving the second firmware when the first key and the second key are the same,
    wherein data stored in the first area and data stored in the second area are unchangeable data.

8. The method according to claim 7, wherein the second key is hash data which is generated by coding, according to a hash algorithm, data obtained by merging the second firmware, the first data and the second data.

9. The method according to claim 8, wherein the hash algorithm is SHA-256.

10. The method according to claim 7, wherein the first key is stored in the same memory block in which the first firmware is stored.

11. The method according to claim 7, wherein the first data includes at least one among wafer coordinate information of the memory controller, trim information on a supply voltage and calibration information on the supply voltage.

12. The method according to claim 7, wherein the second data includes at least one among information on an initial bad block included in the memory device, default read bias information and wafer coordinate information of the memory device.

13. A method of protecting original code, the method comprising:
    generating a first key by coding a sequence of the original code and data according to a hash algorithm;
    encrypting the original code using the first key according to a symmetric key algorithm to store the encrypted code in a system;
    decrypting the stored code using the first key according to the symmetric key algorithm;
    generating a second key by coding the sequence of the decrypted code and the data according to the hash algorithm; and
    comparing the first and second keys to determine whether the original code is protected,
    wherein the data is specific to the system.

* * * * *